D. Anthony,
Horse Power.

Nº 5,215.   Patented Aug. 7, 1847.

UNITED STATES PATENT OFFICE.

DAVID ANTHONY, OF SHARON, NEW YORK.

HORSE-POWER.

Specification of Letters Patent No. 5,215, dated August 7, 1847.

*To all whom it may concern:*

Be it known that I, DAVID ANTHONY, of Sharon, in the county of Schoharie and State of New York, have invented a new and Improved Horse-Power; and I do hereby declare that the following is a full, clear, and exact description of the same, reference being had to the accompanying drawings, making part of this specification, in which—

Figure 1:
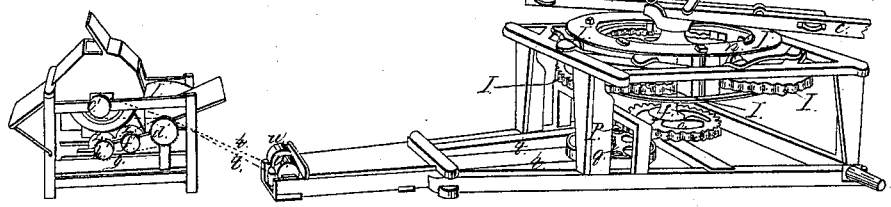
Figure 2:
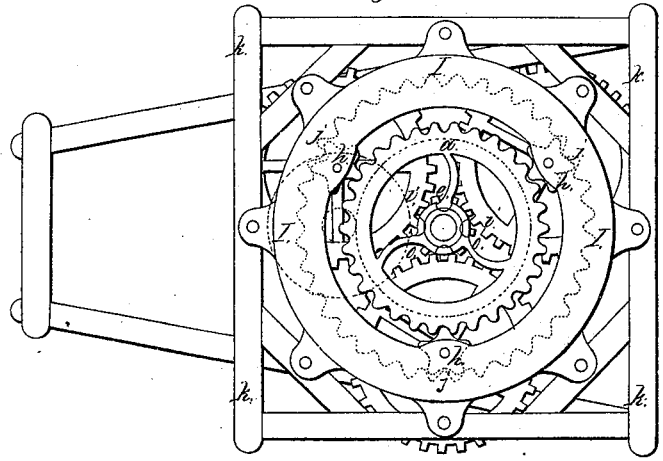
Figure 3:
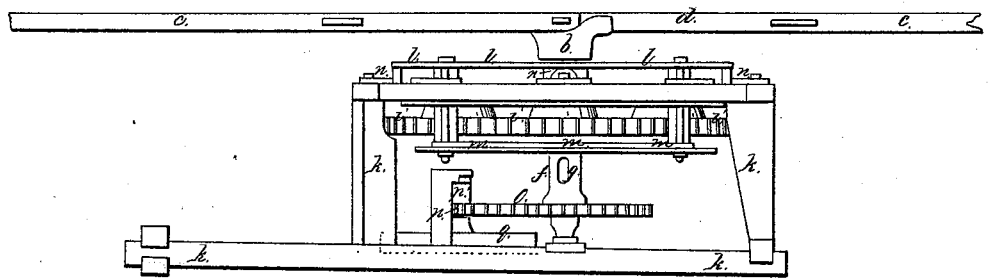

Figure 1 is a perspective view of one of my machines arranged for operation; Fig. 2 is a top view, and Fig. 3 is a side elevation.

$a$ (see Fig. 2) is the principal driving wheel—its hub projects upward and receives the cap $b$, to which the middle band of the horse levers $c$, $d$, $c$, is bolted. It is keyed upon the top of a spindle, which, it must be observed, passes downward through the eye of the concentric pinion $e$, $e$, $e$, without being in any way connected therewith; said pinion being keyed upon a sleeve $f$, (see Fig. 3) which incloses the spindle, and revolves freely and independently about it. The spindle is seen at $g$, which is an aperture made through the sleeve for the purpose of oiling.

The wheel $a$ drives the three pinions $h$, $h$, $h$, upon the shafts of the wheels $i$, $i$, $i$. These pinions run between the periphery of the driving wheel $a$ and the stationary interior segment $j$, $j$, $j$, (represented by dotted lines in Fig. 2,) which is firmly bolted to the frame $k$, $k$, $k$.

The shafts which bear the pinions $h$, $h$, $h$ and the wheels $i$ $i$ $i$, are embraced between two annular flanges $l$, $l$, $l$, $m$ $m$ $m$, in the same manner as the wheels of a pocket watch are contained between the upper and lower plates. These flanges are at liberty to revolve horizontally, the upper one being supported by and revolving upon friction wheels $n$, $n$, $n$. It will be seen that the flanges $l$, $l$, $l$,—$m$ $m$ $m$, together with the wheels $i$ $i$ $i$ and pinions $h$, $h$, $h$, upon the same shafts form a system, which by the action of the driving wheel $a$ is made to revolve about the axis of this latter as a center;—the wheels and pinions not only turning upon their own axes, but revolving in an orbit, and carrying around the flanges.

The wheels $i$ $i$ $i$ revolve about and all work into the pinion $e$ $e$ $e$, before mentioned as being keyed upon the sleeve $f$, which incloses the spindle of the driving wheel $a$.

Upon the lower end of this sleeve is a wheel $o$ which drives the pinion $p$ upon the shaft $p'$ of the horizontal band wheel or pulley $q$ (see Fig. 3). The wheel and pinion $o$ and $p$, as also the pulley $q$ are merely indicated by red circles in Fig. 2 in order to prevent confusion.

The advantage of my system of gearing as above described, I conceive to be as follows—First—the main vertical or horse shaft being supported by the wheels $i$ $i$ $i$, the friction arising from the bearing which would be otherwise required, is avoided. Secondly—as the teeth of the pinions $h$ $h$ $h$, are engaged upon opposite sides, there is no pressure or consequent friction upon the upper bearing of their shafts. Thirdly—as the wheels and pinions roll about one another;—all the friction arising from the action of their teeth, if they be properly formed, is rolling, instead of rubbing friction. Fourthly—as the pinions $h$, $h$, $h$, advance in their orbits, at the same time that they revolve upon their axes—they accomplish their revolutions in a shorter time than under other conditions;—thus creating a gain in getting up the speed.

Figure 4:
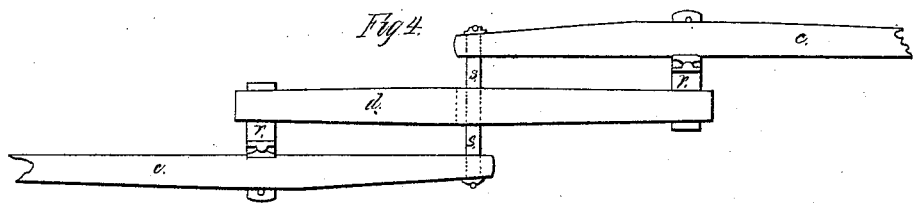

Fig. 4 represents the horse levers, the middle bar, $d$, is, as before stated bolted to the cap $b$ and short horizontal stud, $r$, formed into each end, serves as a fulcrum for the levers $c$ $c$ to which the horses are attached. An iron bar, $s$, $s$, plays freely through a slot in the middle bar, and is secured at each end to the horse lever $c$, $c$. It will be seen that by this arrangement, the horses pull against each other, making it necessary that each horse should perform an equal portion of the labor, and preventing sudden jerks and strains upon the machinery.

What I claim as my invention and desire to secure by Letters Patent is,

The manner in which I have arranged and combined the interior segment $j$, $j$, $j$, $j$, with the driving wheel $a$ and the traveling pinions $h$, $h$, $h$,—the latter moving around the former, while they turn upon their own axes, and give motion to the wheels $i$, $i$, $i$, which drive the pinion $e$, $e$, $e$, upon the sleeve $f$.

DAVID ANTHONY.

Witnesses:
- MURRY I. NOAK,
- ORRIN N. GRIFFITH.